United States Patent
Hofmann (10) Patent No.: US 9,285,860 B2
(45) Date of Patent: Mar. 15, 2016

(54) APPARATUS AND METHODS EMPLOYING VARIABLE CLOCK GATING HYSTERESIS FOR A COMMUNICATIONS PORT

(75) Inventor: Richard Gerard Hofmann, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 1675 days.

(21) Appl. No.: 12/772,484

(22) Filed: May 3, 2010

(65) Prior Publication Data

US 2011/0271134 A1 Nov. 3, 2011

(51) Int. Cl.
*G06F 1/32* (2006.01)
*G06F 1/04* (2006.01)

(52) U.S. Cl.
CPC .......... *G06F 1/3215* (2013.01); *G06F 1/3237* (2013.01); *G06F 1/04* (2013.01)

(58) Field of Classification Search
CPC ............................. G06F 1/3215; G06F 1/3237
USPC ......................................................... 713/322
See application file for complete search history.

(56) References Cited

U.S. PATENT DOCUMENTS

| | | | |
|---|---|---|---|
| 6,021,506 A | 2/2000 | Cho et al. | |
| 6,079,024 A * | 6/2000 | Hadjimohammadi et al. | ............................ 713/322 |
| 7,065,665 B2 | 6/2006 | Jacobson et al. | |
| 7,076,681 B2 | 7/2006 | Bose et al. | |
| 7,472,299 B2 * | 12/2008 | Mukherjee | ..................... 713/323 |
| 7,605,612 B1 | 10/2009 | Chiang et al. | |
| 7,647,515 B2 * | 1/2010 | Verdun | ......................... 713/320 |
| 2003/0135676 A1 | 7/2003 | Jensen | |
| 2003/0226050 A1 * | 12/2003 | Yik et al. | ...................... 713/324 |
| 2004/0039878 A1 | 2/2004 | van de Waerdt | |
| 2009/0228733 A1 * | 9/2009 | Wang | ............................ 713/500 |
| 2009/0265573 A1 | 10/2009 | Tanabe | |
| 2009/0300388 A1 | 12/2009 | Mantor et al. | |

FOREIGN PATENT DOCUMENTS

| | | |
|---|---|---|
| CN | 1679006 A | 10/2005 |
| JP | H0854954 A | 2/1996 |
| JP | H1153049 A | 2/1999 |
| JP | H11212888 A | 8/1999 |
| JP | 2003067691 A | 3/2003 |
| JP | 2003256066 A | 9/2003 |

OTHER PUBLICATIONS

Xiaotao Chang et al., "Adaptive Clock Gating Technique for Low Power IP Core in SoC Design", IEEE International Symposium on Circuits and Systems, May 2007, pp. 2120-2123.
International Search Report and Written Opinion—PCT/US2011/034080—ISA/EPO—Oct. 5, 2011.

* cited by examiner

*Primary Examiner* — Albert Wang
(74) *Attorney, Agent, or Firm* — Chui-kiu Teresa Wong; Paul Holdaway (57) ABSTRACT

An apparatus includes a communications port configured to communicate over a bus responsive to a clock signal and a clock signal generation circuit configured to generate the clock signal and to vary a gating hysteresis of the clock signal responsive to a control input, such as a communications transaction of the port. The clock signal generation circuit may be configured to vary the gating hysteresis of the clock signal based on an attribute of the transaction, such as an address of the transaction and/or a payload communicated in the transaction.

22 Claims, 12 Drawing Sheets

APPARATUS AND METHODS EMPLOYING VARIABLE CLOCK GATING HYSTERESIS FOR A COMMUNICATIONS PORT

FIELD OF DISCLOSURE

The present disclosure relates to clock control in electronic systems and, more particularly, to clock gating apparatus and methods.

BACKGROUND

Power consumption is often a major concern in electronic systems, particularly in portable devices that are powered by batteries, such as laptop computers, netbook computers and smart phones. In addition to power consumption from functions such as display backlighting, such device may include integrated circuits, such as processors, that consume relatively large amounts of power during operation. For example, such integrated circuits may generate a multitude of clock signals that are used as time references for data processing, storage and transfer operations, and a relatively large amount of power may be expended in generating such clock signals. Such clock signals may also generate significant signal noise that may interfere with internal operations and operations of adjacent devices.

Clock control is a commonly used technique to reduce power consumption in integrated circuits. U.S. Pat. No. 7,076,681 to Bose et al., U.S. Pat. No. 7,065,665 to Jacobson et al., U.S. Patent Application Serial No. 2009/0300388 to Mantor et al., U.S. Pat. No. 7,605 to Chiang et al. and an article entitled "Adaptive Clock Gating Technique for Low-Power IP Core in SoC Design" by Chang et al. describes various clock control techniques.

SUMMARY OF THE DISCLOSURE

In accordance with some embodiments, an apparatus includes a communications port configured to communicate over a bus responsive to a clock signal and a clock signal generation circuit configured to generate the clock signal and to vary a gating hysteresis of the clock signal responsive to a communications transaction of the port. The clock signal generation circuit may be configured to vary the gating hysteresis of the clock signal based on an attribute of the transaction, such as an address of the transaction and/or a payload communicated in the transaction. In further embodiments, the port may include a plurality of ports of a data routing fabric circuit and the clock signal generation circuit may be configured to independently vary respective gating hysteresis of clock signals of respective ones of the plurality of ports.

Further embodiments provide apparatus including a data routing fabric circuit comprising a plurality of ports configured to communicate with nodes external to the data routing fabric circuit according to associated clock signals. The apparatus further includes a control circuit configured to store a value representative of a time delay and to delay gating of a clock signal of at least one of the ports based on the stored value. The control circuit may be configured to store a plurality of values representing respective time delays, to select one of the stored values and to delay gating of the clock signal of the at least one of the ports based on the selected value. For example, the control circuit may be configured to select one of the stored values based on an attribute of a communications transaction involving the at least one of the ports.

Some embodiments provide methods of operating a communications port including varying a gating hysteresis for a clock signal of the port responsive to a communications transaction of the port. Varying a gating hysteresis may include varying the gating hysteresis based on an attribute of the transaction, such as an address of the transaction and/or a payload communicated in the transaction. The port may include a plurality of ports of a data routing fabric circuit and varying a gating hysteresis may include independently varying respective clock gating hysteresis of clock signals of respective ones of the plurality of bus ports.

Further embodiments provide methods of operating a data routing fabric circuit comprising a plurality of ports configured to communicate with nodes external to the data routing fabric circuit. The methods include storing a value representative of a time delay and delaying gating of a clock signal of at least one of ports based on the stored value. Storing a value indicative of a time delay may include storing a plurality of values representing respective time delays, and delaying gating of a clock signal of at least one of the ports based on the stored value may be preceded by selecting one of the stored values. Gating of the clock signal may be delayed based on the selected value.

DETAILED DESCRIPTION

While the inventive subject matter is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some embodiments of the present invention include methods, apparatus, and/or computer readable media. A computer-readable medium may include any medium that can contain or store program code for use by or in connection with an instruction execution system, apparatus, or device. The computer-usable or computer-readable medium may be, for example but not limited to, an electronic, magnetic, optical, electromagnetic, infrared, or semiconductor system, apparatus or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), and a compact disc read-only memory (CD-ROM).

Some embodiments may take the form of computer-readable media having computer instructions embodied therein executable by a data processing device to produce fabrication instructions for circuitry as described herein that may be physically instantiated as an integrated circuit or portion thereof. The computer-readable media may have instructions embodied therein that may take a variety of forms, including, but not limited to, behavioral, register transfer, logic component, transistor and layout geometry-level instructions. Data formats for such instructions may include, but are not limited to, formats supporting behavioral languages like C, formats supporting register transfer level RTL languages like Verilog and VHDL, formats supporting geometry description languages (such as GDSII, GDSIII, GDSIV, CIF, and MEBES), and other suitable formats and languages. Such instructions may be provided as soft and/or hard IP cores.

Embodiments are described herein with reference to flowcharts, block diagrams and other representations of methods, apparatus and/or computer readable media in accordance with some embodiments of the invention. It will be understood that each block of a flowchart or block diagram illustration, and combinations of such blocks, may be implemented by program instructions and/or hardware operations. These program instructions may be provided to a processing apparatus to produce a machine, such that the instructions, which execute via the processing apparatus, create means for implementing the functions specified in the flowchart and/or block diagram block or blocks.

Figure 1:
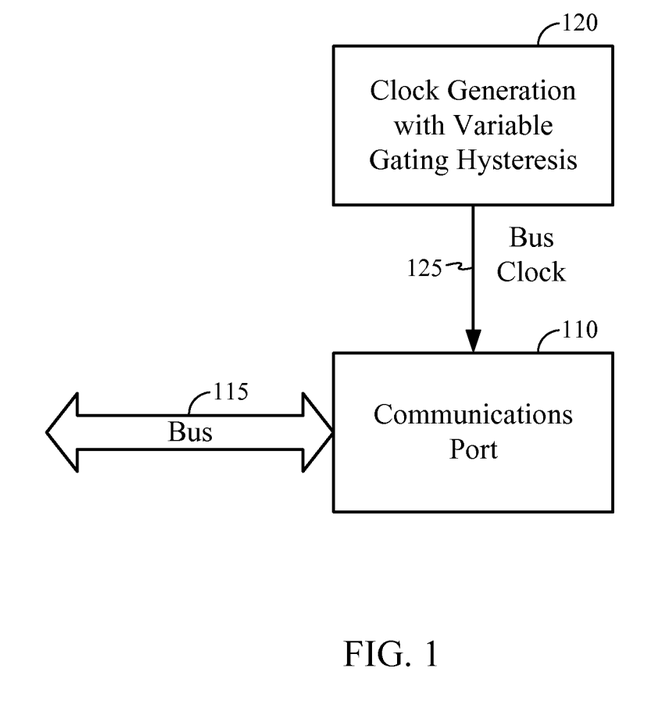
FIG. 1 is a block diagram illustrating a communications port with adjustable bus clock gating delay.

FIG. 1 illustrates a general application of some embodiments of the present invention. A communications port 110 is configured to conduct communications transactions over a bus 115. The bus 115 may be, for example, a serial or parallel bus that is configured to transfer information during such a transaction in synchronism with a bus clock signal 125. The bus 115 may be a dedicated connection between the communications port 110 and one other device (e.g., another port), or may be a shared bus that may be accessed by three or more devices. The communications port 110 may include, for example, a buffer or other type of data transfer circuit configured to transfer data in synchronism with the bus clock signal 125 or a signal derived therefrom. The bus clock signal 125 is generated by a clock generation circuit 120 that may be controlled to vary the time the clock signal 125 remains active following one or more communications transactions, for example, by providing a variable gating hysteresis (delay). In some embodiments explained in detail below, a variable clock gating hysteresis can be used to reduce latency that may arise from delays for clock enablement at the beginning of transactions. According to further embodiments, the amount of gating hysteresis may be adapted responsive to one or more attributes of one or more transactions occurring on the bus 115. For example, the amount of hysteresis may be dependent upon transfer attributes of a communications transaction, such as addresses involved in a transaction, and/or upon information conveyed to the port in response to a transaction, such as express or implicit hysteresis information.

Figure 2:
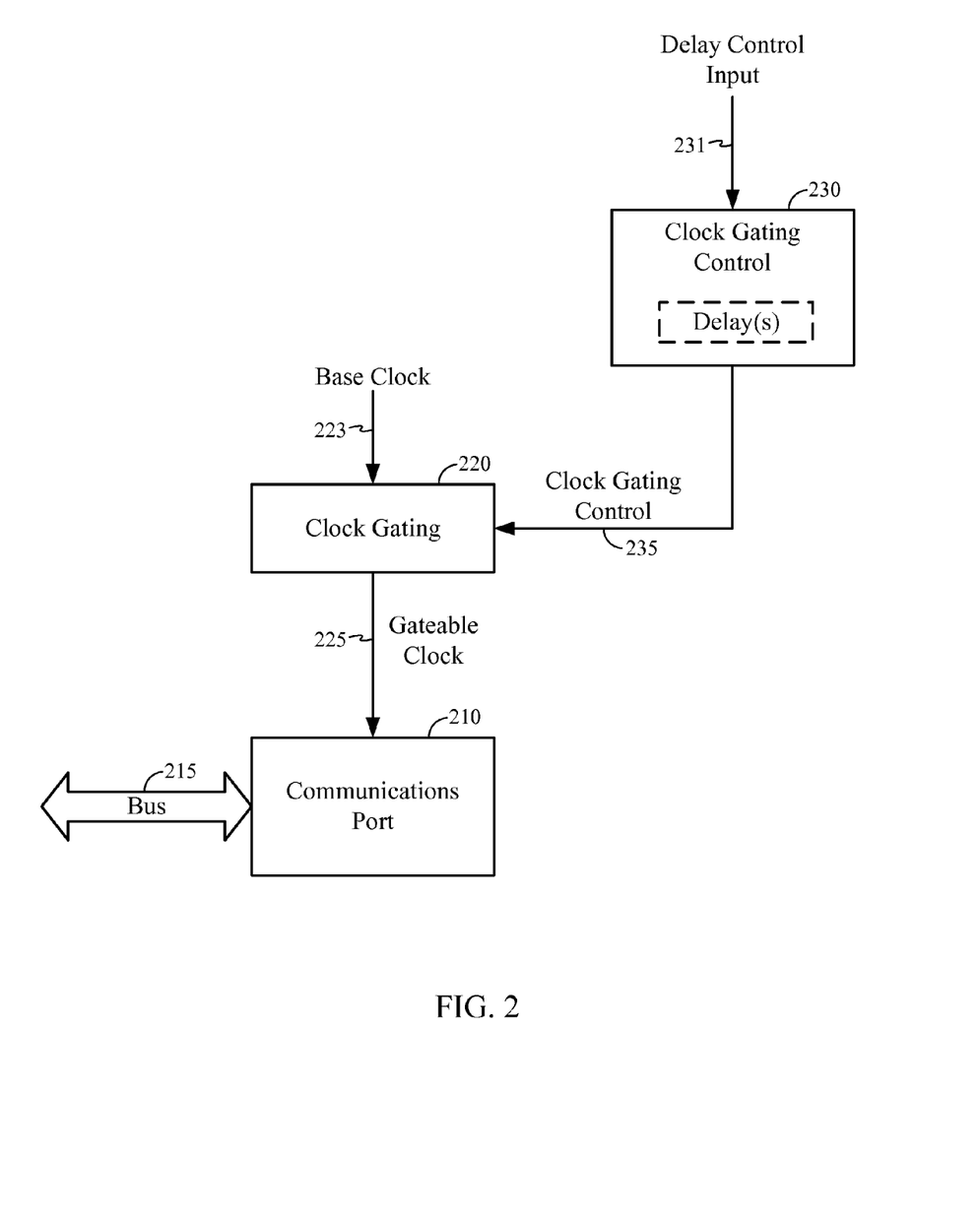
FIG. 2 is a block diagram illustrating a communications port with adjustable bus clock gating delay.

FIG. 2 illustrates an example implementation according to further embodiments. A communications port 210 is configured to send and receive data via a bus 215 responsive to a gateable clock signal 225. A clock gating circuit 220 generates the gateable clock signal 225 from a base clock signal 223 responsive to a clock gating control signal 235. A clock gating control circuit 230 generates the clock gating control signal 235 responsive to a delay control input 231. The delay control input 231 may include, for example, a signal indicative of a transaction state of the bus 215, which may be used to indicate, for example, completion or impending completion of a communications transaction from which a delay is to be timed. The delay control input 231 may also include a delay selection input. For example, the delay control input 231 may include a signal facilitating user programming of a particular delay to be applied by the clock gating control circuit 230 or a delay selection input generated by some other circuit component. The delay control input 231 may also include a signal indicative of one or more attributes of one or more transactions occurring on the bus 215, which may be used to determine a particular delay to be applied by the clock gating control circuit 230. As shown, the clock gating control circuit 230 may apply a single delay and/or may be configured to selectively apply one of a plurality of post-transaction delays based on the delay control input 231.

As noted above, a delay value may be selected based on an attribute of one or more communications transactions on the bus 215. For example, the clock gating control circuit 230 may store a table that cross-references particular attributes with particular delays. In some applications, for example, it may be determined that certain addresses may be correlated with the relative frequency of communications transactions that may occur on the bus 215. For example, enablement of the gateable clock signal 225 may introduce a certain amount of latency once it is determined that a transaction is to occur over the bus 215. Certain source and/or destination addresses may be associated with transactions that occur in bursts, such that it may be desirable to prevent gating of the gateable clock signal 225 for a sufficient time following a given transaction such that it need not be re-enabled for a succeeding transaction. This may be accomplished by using a delay value that is sufficiently long to prevent gating of the gateable clock signal 225 before the next transaction occurs. In contrast, certain source and/or destination addresses may be associated with transactions that are relatively spaced apart in time, such that it may be desirable to use a very short delay or no delay following a given transaction because the reduction in power consumption from gating the gateable clock signal 225 may outweigh the benefits of reducing latency associated with clock enablement. Transaction attributes other than addresses, such as content conveyed by one or more bus transaction, may also be used as bases for selecting clock gating delays. Delay selection inputs may also include explicit and/or implicit messages that instruct a port to use a particular delay. It will be appreciated that, in general, any one or a combination of such inputs may be used to determine or select an appropriate clock gating delay.

Figure 3:
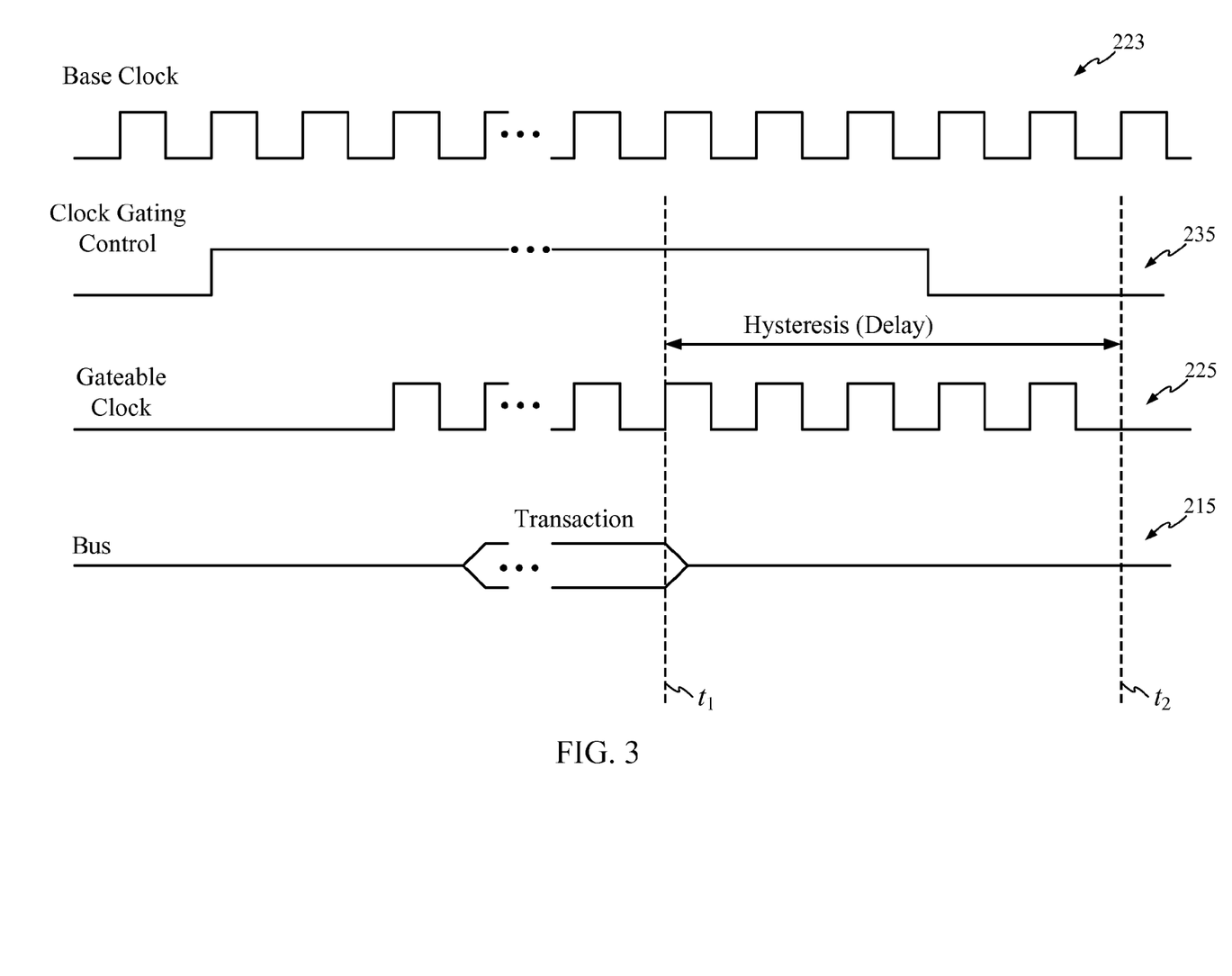
FIG. 3 is a timing diagram illustrating operations of the apparatus of FIG. 2.

FIG. 3 illustrates exemplary operations of the circuitry of FIG. 2. Responsive to assertion of the clock gating control signal 235, the gateable clock signal 225 is enabled (i.e., un-gated), allowing a bus transaction to proceed on the bus 215. Following completion of the transaction at a time $t_1$, the clock gating control signal 235 remains asserted for a time period following the transaction, providing a hysteresis in gating of the gateable clock signal 225 until a time $t_2$. As shown in FIG. 3, there may be latency in enablement and/or gating of the gateable clock signal 225 after assertion and/or deassertion of the clock gating control signal 235. It will be appreciated that the signal relationships shown in FIG. 3 are provided for purposes of illustration, and that the signals shown therein may be implemented in other ways, such as by using signal states that are inverted with respect to those shown in FIG. 3 and/or different signal latencies than those shown in FIG. 3 and other combinations of rising and/or falling edge logic.

Figure 4:
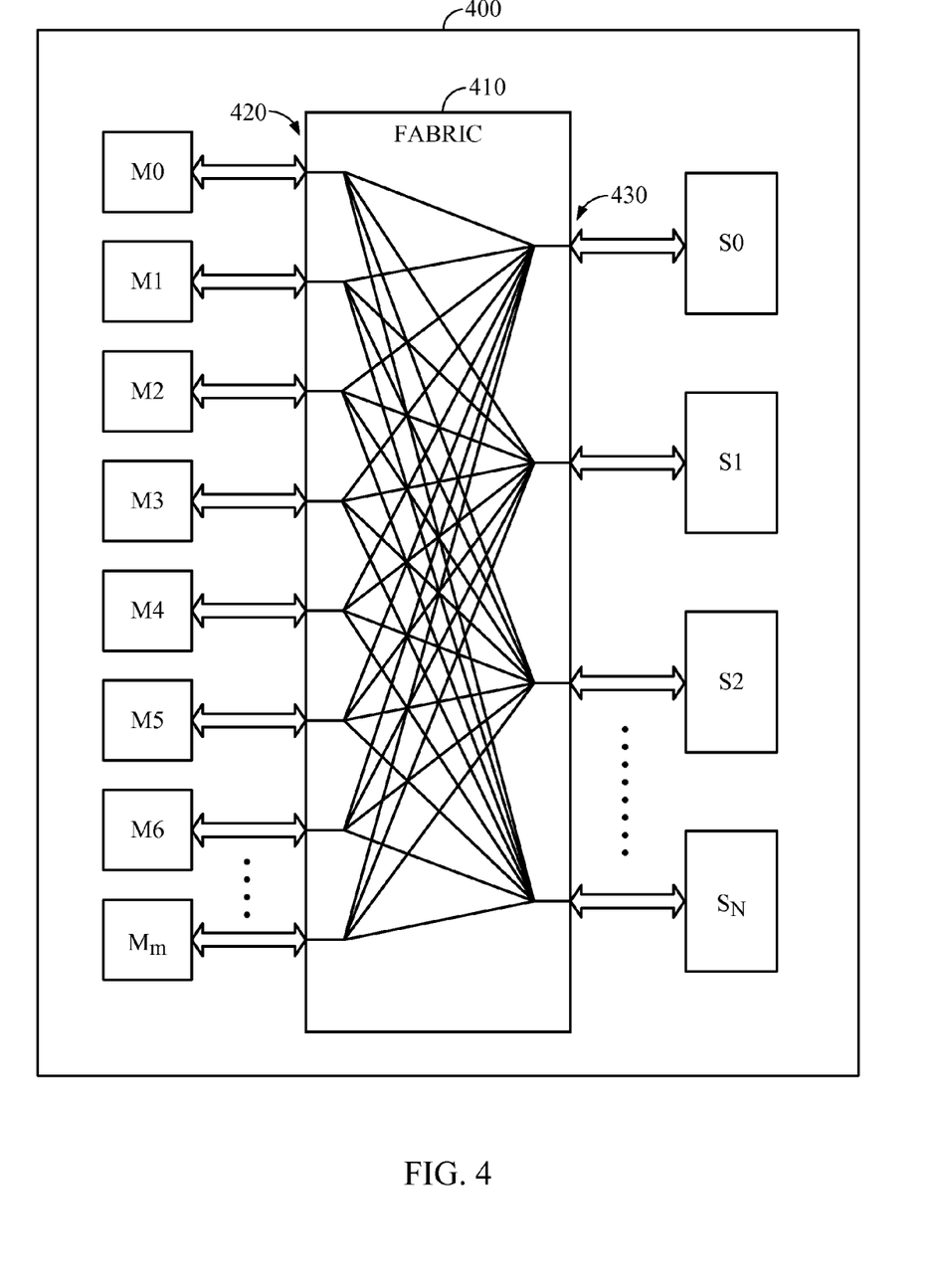
FIG. 4 is a block diagram illustrating a data routing fabric circuit with variable clock gating hysteresis.

According to some embodiments, clock gating control along the lines described above may be used for ports of a data routing fabric circuit used to interconnect various functional units in a circuit. FIG. 4 illustrates an example of an implementation, in particular, of a circuit 400 including a plurality of functional master units M0, M1, . . . , Mm and slave S0, S1, . . . , Sn that are interconnected by a data routing fabric circuit 410 having a plurality of master ports 420 and slave ports 430. The master units M0, M1, . . . , Mm and slave units S0, S1, . . . , Sn may comprise various processing, memory, interface and other circuits. The master units M0, M1, . . . , Mm and/or the slave units S0, S1, . . . , Sn may correspond, for example, to various IP cores. The data routing fabric circuit 410 may act as a crossbar switch that selectively routes messages between the master and slave ports 420, 430. Each bus connecting one of the masters M0, M1, . . . , Mm and a corresponding one of the master ports 420 may be independently controlled and may use independent clock domains. The same may be true for busses connecting the slave ports 420 and the slaves S0, S1, . . . , Sn.

Figure 5:
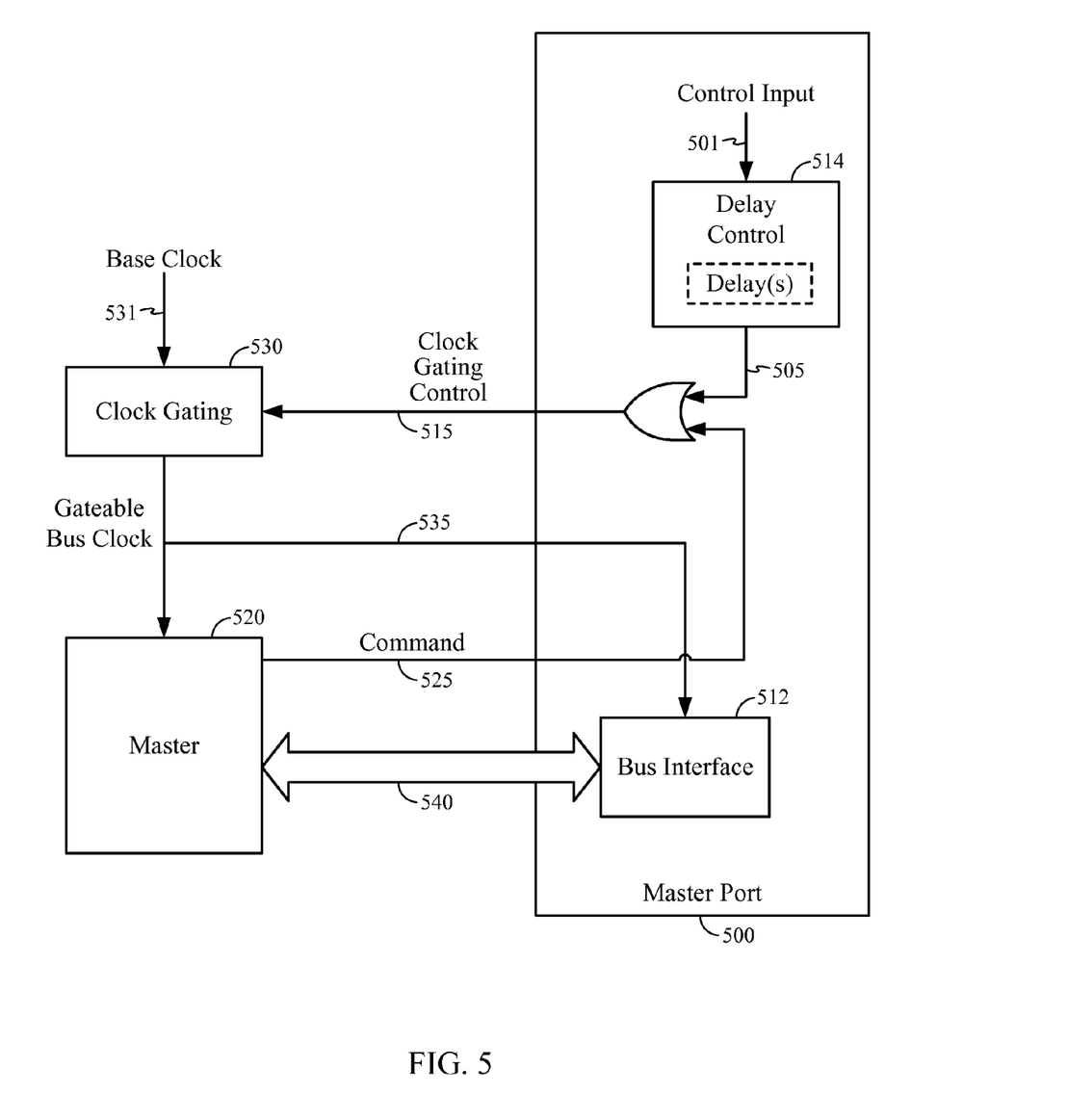
FIG. 5 is a block diagram illustrating clock gating circuitry for a master port of the data routing fabric circuit of FIG. 4.

FIG. 5 illustrates an example of an implementation of a master port 500 according to some embodiments. The master port 500 may include a bus interface circuit 512 that is clocked with a same gateable bus clock signal 535 used to clock a master 520. As shown, the gateable bus clock signal 535 may be generated by a clock gating circuit 530, which receives a base clock signal 531 and generates the gateable clock signal 535 therefrom responsive to a clock gating control signal 515. In some embodiments, the clock gating circuit 530 may be included in the same data routing fabric circuit 410 as the master port 500. Such functionality could also be implemented outside of the data routing fabric circuit 410, for example, in the master 520. The master port 500 also includes a delay control circuit 514 configured to generate a delay control signal 505 responsive to a control input 501. The delay control signal 505 is logically combined with a clock command signal 525 (e.g., a command to turn on the bus clock) generated by a master 520 to generate the clock gating control signal 515. Thus, as shown, if either the clock command signal 525 or the delay control signal 505 is asserted, the clock gating control signal 515 is asserted to prevent gating of the gateable bus clock signal 535.

Figure 6:
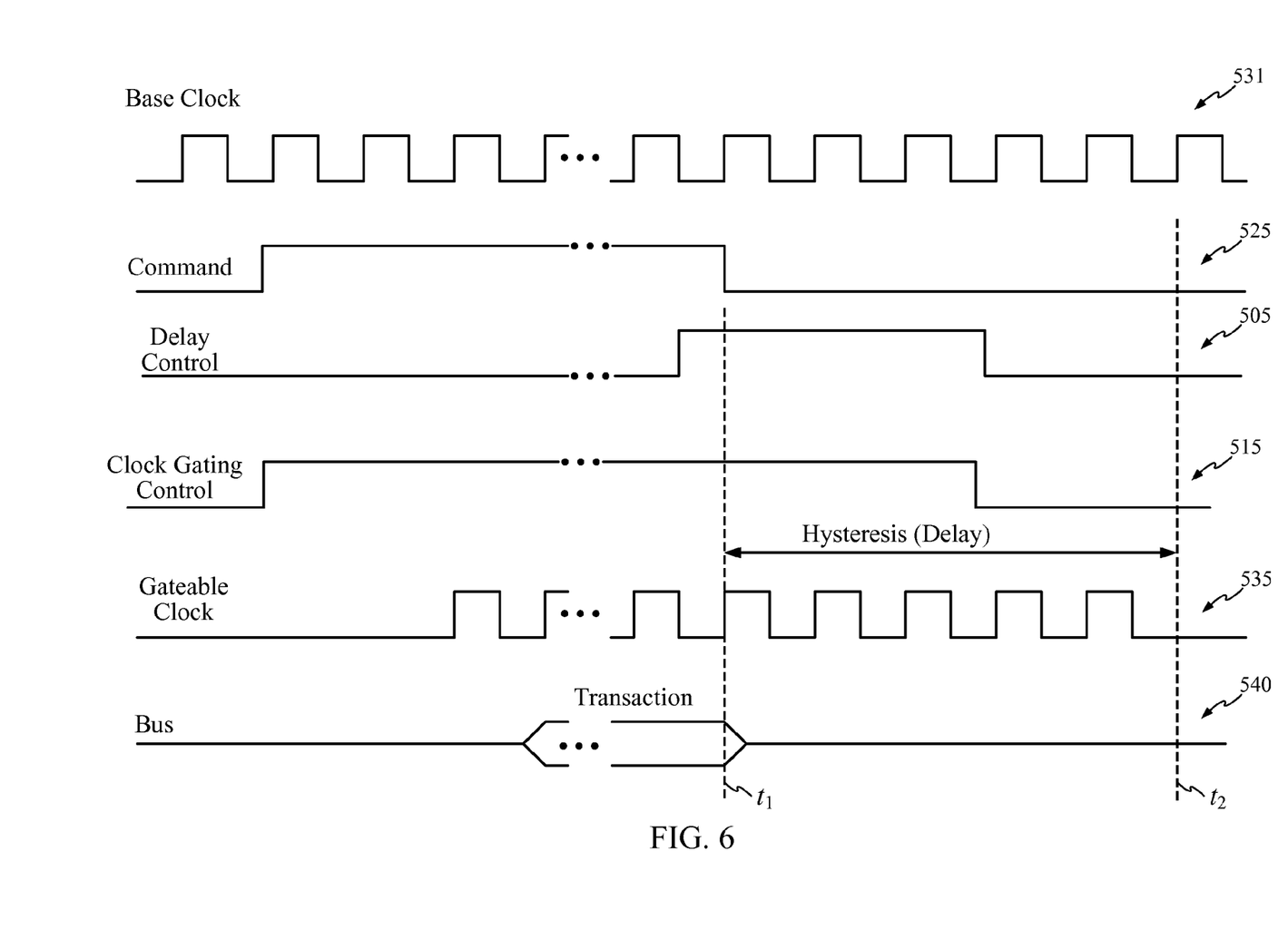
FIG. 6 is a timing diagram illustrating operations of the apparatus of FIG. 5.

FIG. 6 illustrates operations of the circuit of FIG. 5 according to some embodiments. Responsive to assertion of the clock command signal 525, the clock gating control signal 515 is asserted, enabling the gateable clock signal 535. After an ensuing bus transaction is complete at a time $t_1$, the delay control signal 505 prevents gating of the gateable clock signal 535 for an amount of time to avoid additional clock turn-on latency should another bus transaction occur before the delay introduced by the delay control circuit 514 expires at a time $t_2$. As shown in FIG. 6, there may be latency in enablement and/or gating of the gateable clock signal 535 after assertion and/or deassertion of the clock gating control signal 515. It will be appreciated that the signal relationships illustrated in FIG. 6 are provided for purposes of illustration and may be modified in other embodiments.

Figure 7:
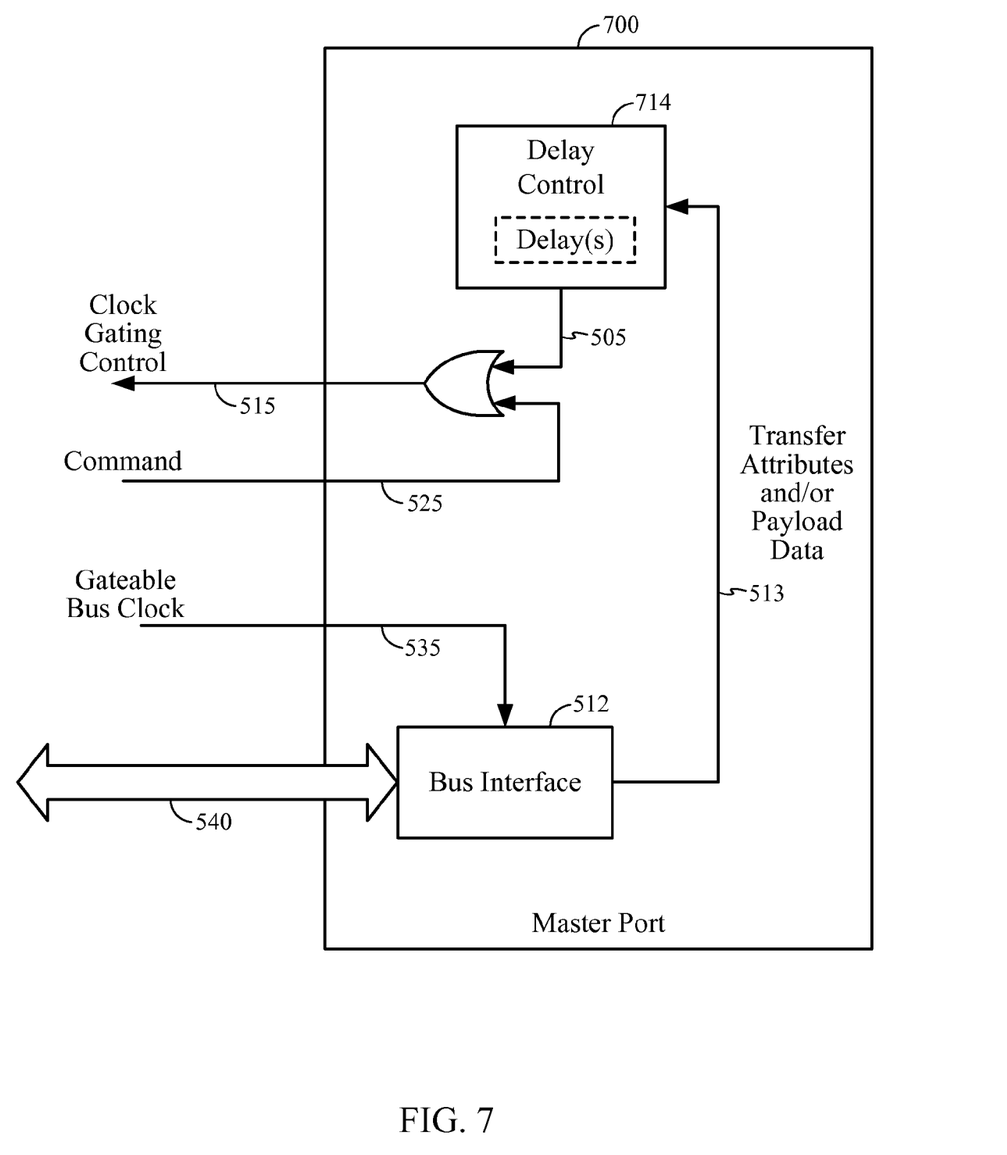
FIG. 7 is a block diagram illustrating clock gating circuitry for a master port of the data routing fabric circuit of FIG. 4.

According to further embodiments, post-transaction clock gating hysteresis for port bus clock signals may be controlled responsive to a variety of different inputs, including, but not limited to, explicit or implicit delay selection inputs and/or attributes of one or more communications transactions occurring on the bus. For example, as shown in FIG. 7, a master port 700 includes components as illustrated in FIG. 5 (indicated by like reference numerals), along with a delay control circuit 714 that operates responsive to transfer attributes (e.g., address, types and other transfer control information) and/or payload data 513 communicated to the master port 700 in one or more bus transactions over the bus 540. For example, the delay control circuit 714 may select a clock gating hysteresis to apply based on destination address information (e.g., an address associated with a slave port to which a message is addressed) communicated during one or more bus transactions. The destination address or addresses may, for example, correlate with a desirable post-transaction delay. The delay control circuit 714 may, for example, store a lookup table that cross-references particular slave addresses with particular clock gating delays and that may be accessed to select a particular clock gating delay to be applied by the delay control circuit 714.

In further embodiments, other transfer attributes, such as type indicia, may be used to control clock gating delays. In still further embodiments, payload data may serve as a basis for adjusting clock gating delay. For example, in some embodiments, a master may pass a value to a master port 700 that explicitly or implicitly indicates a desired clock gating delay to be implemented by the master port 700. According to additional embodiments, a delay control input may include attributes of a plurality of communications transactions, which may be processed in an aggregate manner to determine a clock gating hysteresis to be applied. For example, a series of a particular type of bus transaction may be indicative of an operational mode, and an optimal gating delay may be selected based on such a series of transactions. It will be further appreciated that combinations of such delay control inputs may be used in some embodiments.

Figure 8:
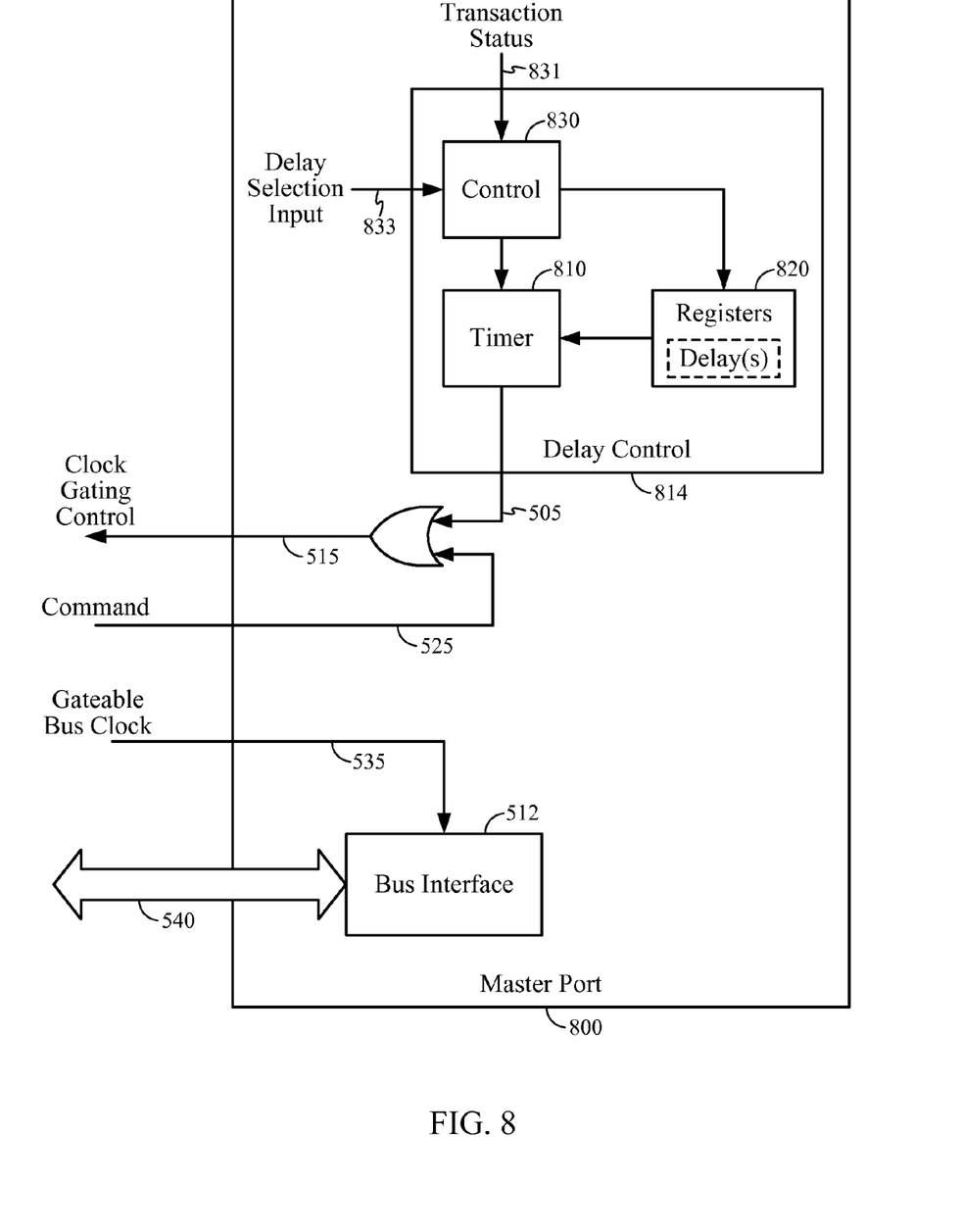
FIG. 8 is a block diagram illustrating clock gating circuitry for a master port of the data routing fabric circuit of FIG. 4.

FIG. 8 illustrates a master port 800 including components as described with reference to FIG. 5 (indicated by like reference numerals), along with a delay control circuit 814 including a hysteresis timer circuit 810, a plurality of registers

820 configured to hold various delay values and a control circuit 830 that controls the timer 810 and registers 820. Responsive to a bus transaction status 831, for example, completion or impending completion of a bus transaction, the control circuit 830 may cause the timer 810 to assert the delay control signal 505 to prevent gating of the gateable bus clock signal 535. The control circuit 830 may contemporaneously load a selected delay value into timer 810 from the registers 820 according to a delay selection input 833, such as transfer attributes and/or payload data as described with reference to FIG. 7. When transaction status 831 indicates completion of a transaction, the timer 810 may count from the loaded value, deasserting the delay control signal 505 when the count reaches a particular state. This may gate the gateable bus clock signal 535 in the absence of a currently pending bus transaction. However, if a new bus transaction has started prior to the timer 810 reaching a particular state, the timer 810 may be halted. The clock gating delay process may be restarted once this pending transaction ends, e.g., the hysteresis timer 810 may be reinitialized to again provide additional clock gating delay after the transaction. The additional delay may be the same as or different from the preceding delay. In some embodiments, the number of consecutive delays provided by the hysteresis timer 810 may also be constrained.

According to further embodiments, clock gating hysteresis may also be applied to a slave port, such as the slave ports 430 of the data routing fabric circuit 410 of FIG. 4. In some embodiments illustrated in FIG. 9, a slave port 900 may include a bus interface circuit 912. The bus interface circuit 912 is configured to communicate with a slave unit 920 via a bus 940 in synchronism with a gateable bus clock signal 935. The gateable bus clock signal 935 is produced from a base clock signal 931 by a clock gating circuit 930. The slave port 900 may further include a delay control circuit 914 configured to generate a delay control signal 905 that causes a desired delay in post-transaction gating of the gateable bus clock signal 935. In the illustrated embodiments, the delay control signal 905 is logically combined with a command signal 925 generated by the slave unit 920 to generate a clock gating control signal 915 such that, for example, if either the delay control signal 905 or the command signal 925 is asserted, gating of the gateable clock signal 935 by a clock gating circuit 930 is prevented. The delay control circuit 914 generates the delay control signal 905 in response to a delay control input 901, which may include, for example, a signal indicative of a state of a communications transaction occurring on the bus 940. In further embodiments, the delay control input 901 may further include an indication of a desired delay, and the delay control circuit 914 may selectively apply one of a plurality of delays in generating the delay control signal 905.

Figure 9:
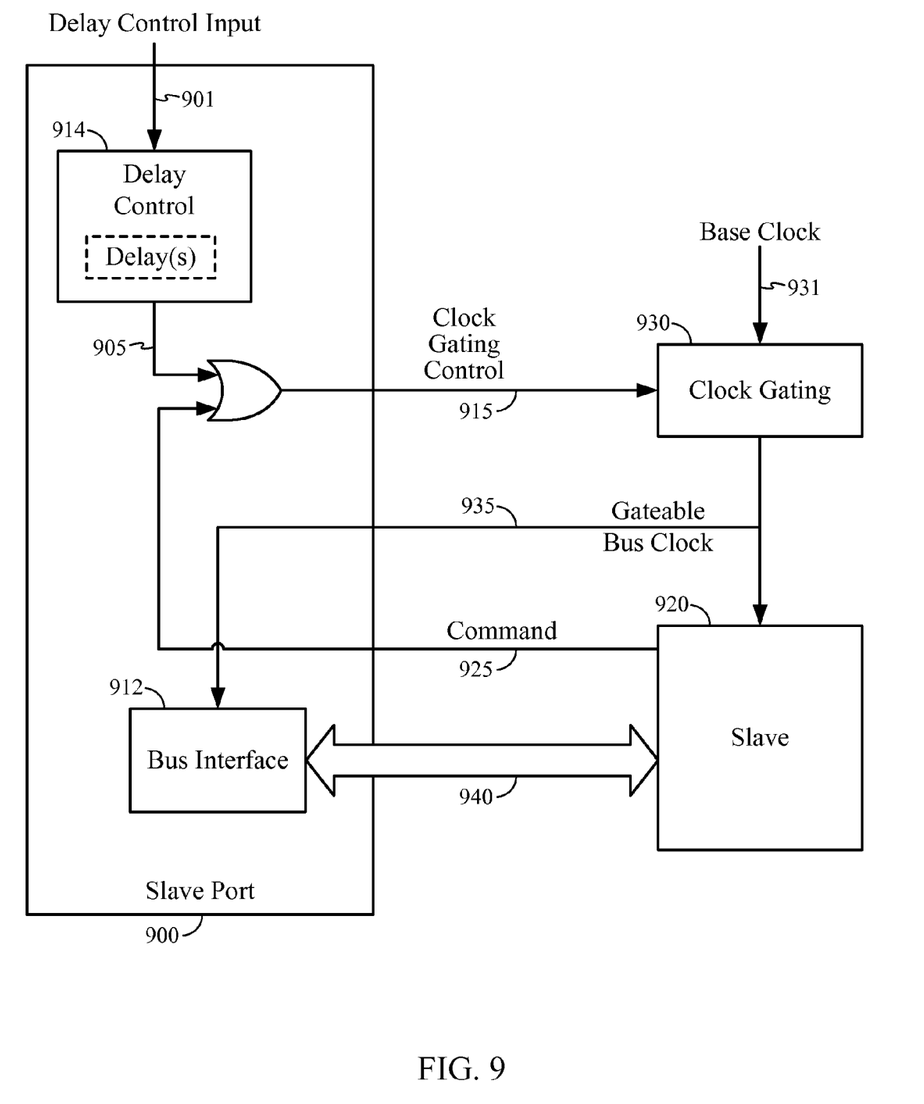
FIG. 9 is a block diagram illustrating clock gating circuitry for a slave port of the data routing fabric circuit of FIG. 4.
Figure 10:
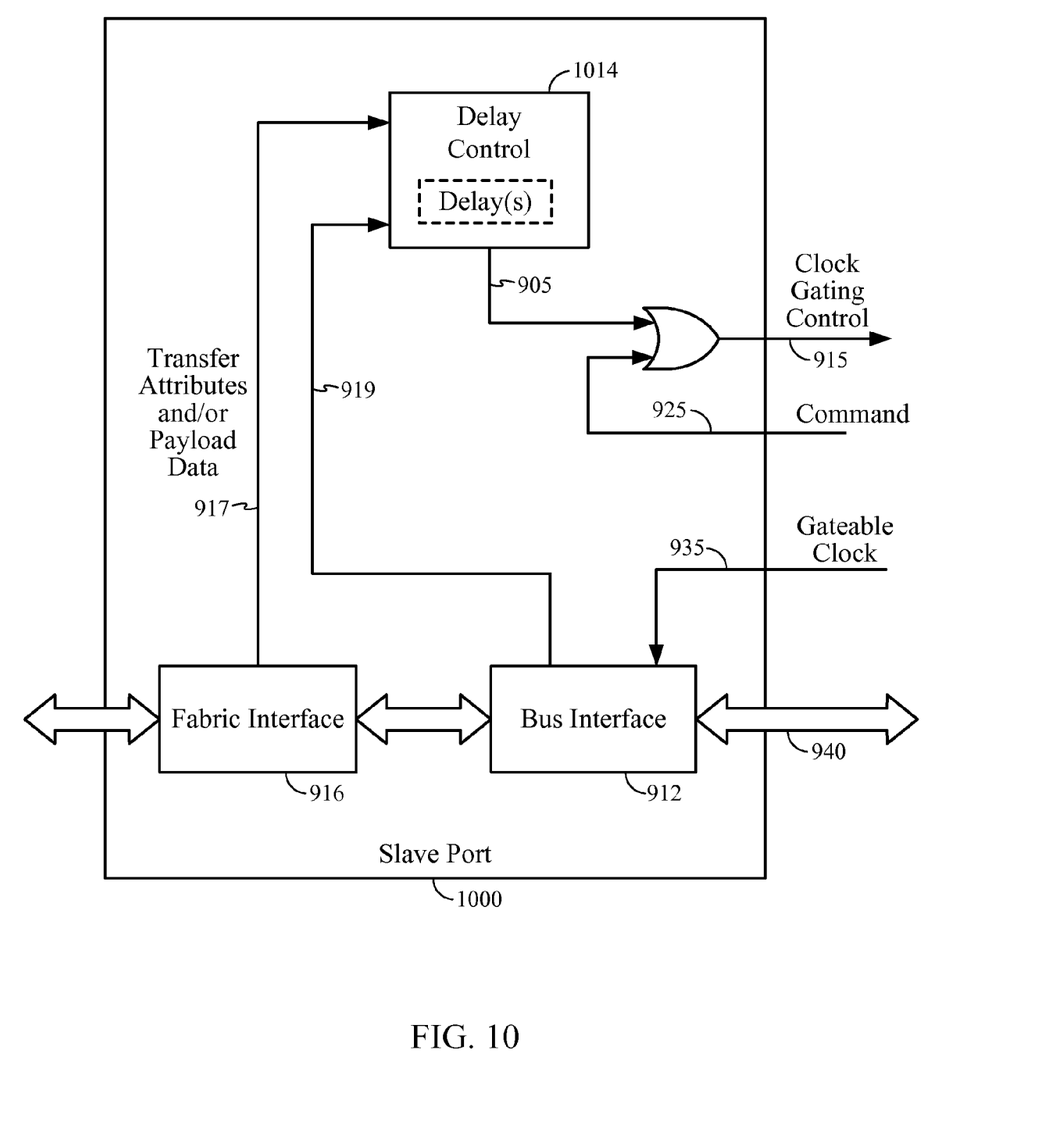
FIG. 10 is a block diagram illustrating clock gating circuitry for a slave port of the data routing fabric circuit of FIG. 4.

Referring to FIG. 10, for example, in a slave port 1000 including components as described with reference to FIG. 9 (indicated by like numerals), a delay control circuit 1014 may receive transfer attributes and/or payload data 917 conveyed to the slave port 1000 from a master port at a fabric interface circuit 916, and the delay control circuit 1014 may select a delay based on this information. For example, a source address included in the information may correlate with a likelihood of an immediately succeeding transaction at the bus 940, which may make it desirable to delay clock gating for a given period to avoid latency associated with re-enabling the gateable clock signal 935. Payload data may also be used as a basis for selection. For example, information that explicitly or implicitly indicates a desired slave port hysteresis may be communicated from a master port to the slave port 1000, and such information may be used to select a clock gating delay.

Similarly, transfer attributes and/or payload data 919 received at the bus interface circuit 912 may be used as a control input to the delay control circuit 1014. For example, much like the master port embodiments described above with reference to FIGS. 5-8, address information passed between the slave port 1000 and a slave unit may be used for controlling gating of the gateable clock signal 935. In some embodiments, the slave unit may be configured to pass explicit and/or implicit delay control information to the slave port 1000, which may use this information to control gating of the gateable clock signal 935.

Figure 11:
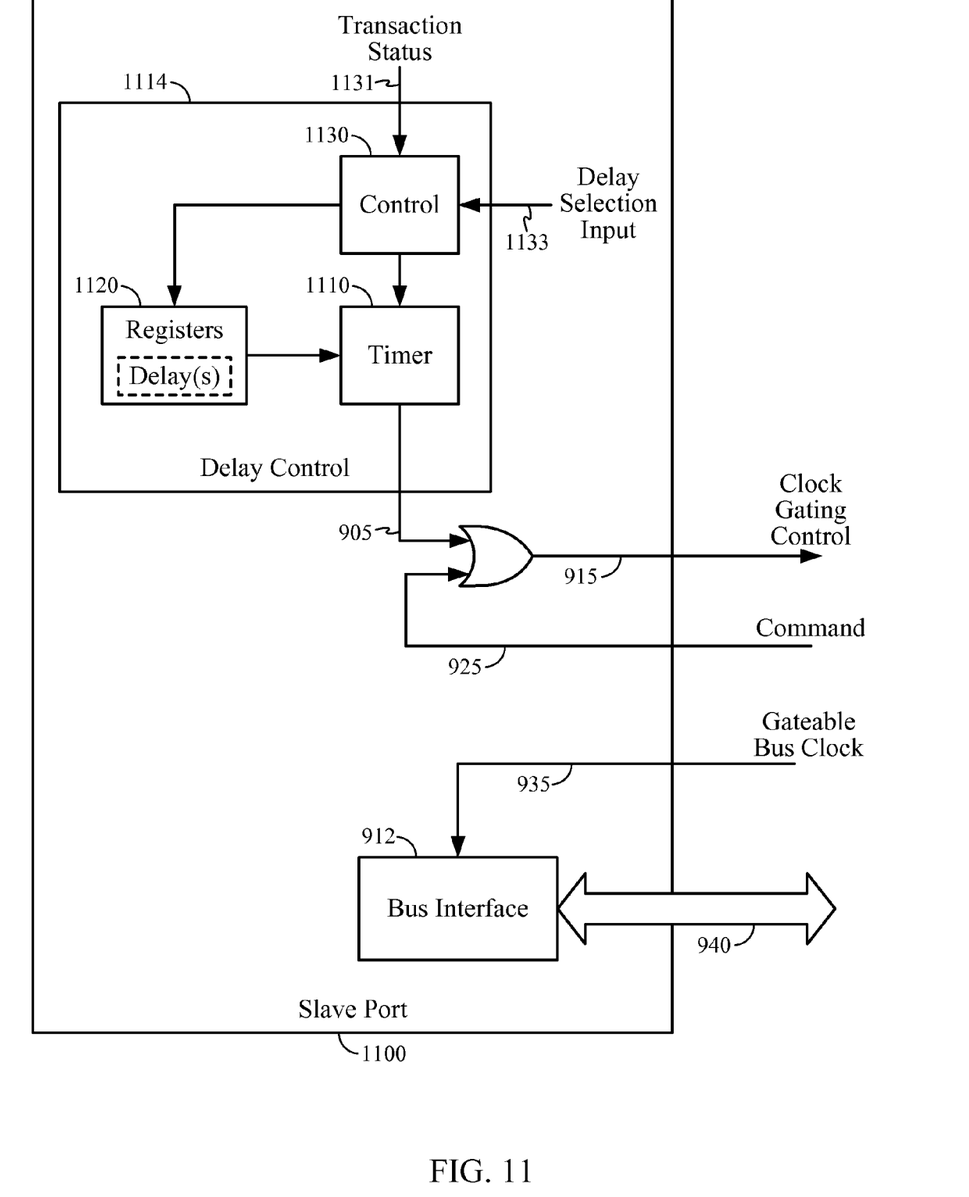
FIG. 11 is a block diagram illustrating clock gating circuitry for a slave port of the data routing fabric circuit of FIG. 4.

FIG. 11 illustrates a slave port 1100 including components as described with reference to FIG. 9 (indicated by like numerals), along with a delay control circuit 1114 having a hysteresis timer circuit 1110, a plurality of registers 1120 configured to hold various delay values and a control circuit 1130 that controls the timer 1110 and registers 1120. Responsive to a bus transaction status 1131, e.g., completion or impending completion of a bus transaction, the control circuit 1130 may cause the timer 1110 to assert the delay control signal 905 to maintain the gateable bus clock signal 935 in an enabled state. The control circuit 1130 may contemporaneously load a selected delay value from the registers 1120 into the timer 1110 according to a delay selection input 1133, such as transfer attributes and/or payload data as described with reference to FIG. 10. When a transaction is complete, the timer 1110 may count from the loaded value, deasserting the delay control signal 905 when the count reaches a particular state. This may gate the gateable bus clock signal 935 in the absence of a currently pending bus transaction. If a new bus transaction has begun before the timer 1110 reaches a particular state, however, the timer 1110 is halted. Once the pending transaction is complete, the clock gating delay process may repeat, e.g., the hysteresis timer 1110 may be reinitialized to again provide an additional clock gating delay. The additional delay may be the same as or different from the preceding delay. The number of consecutive delays provided by the hysteresis timer 1110 between gated periods of the gateable clock signal 935 may also be constrained.

Figure 12:
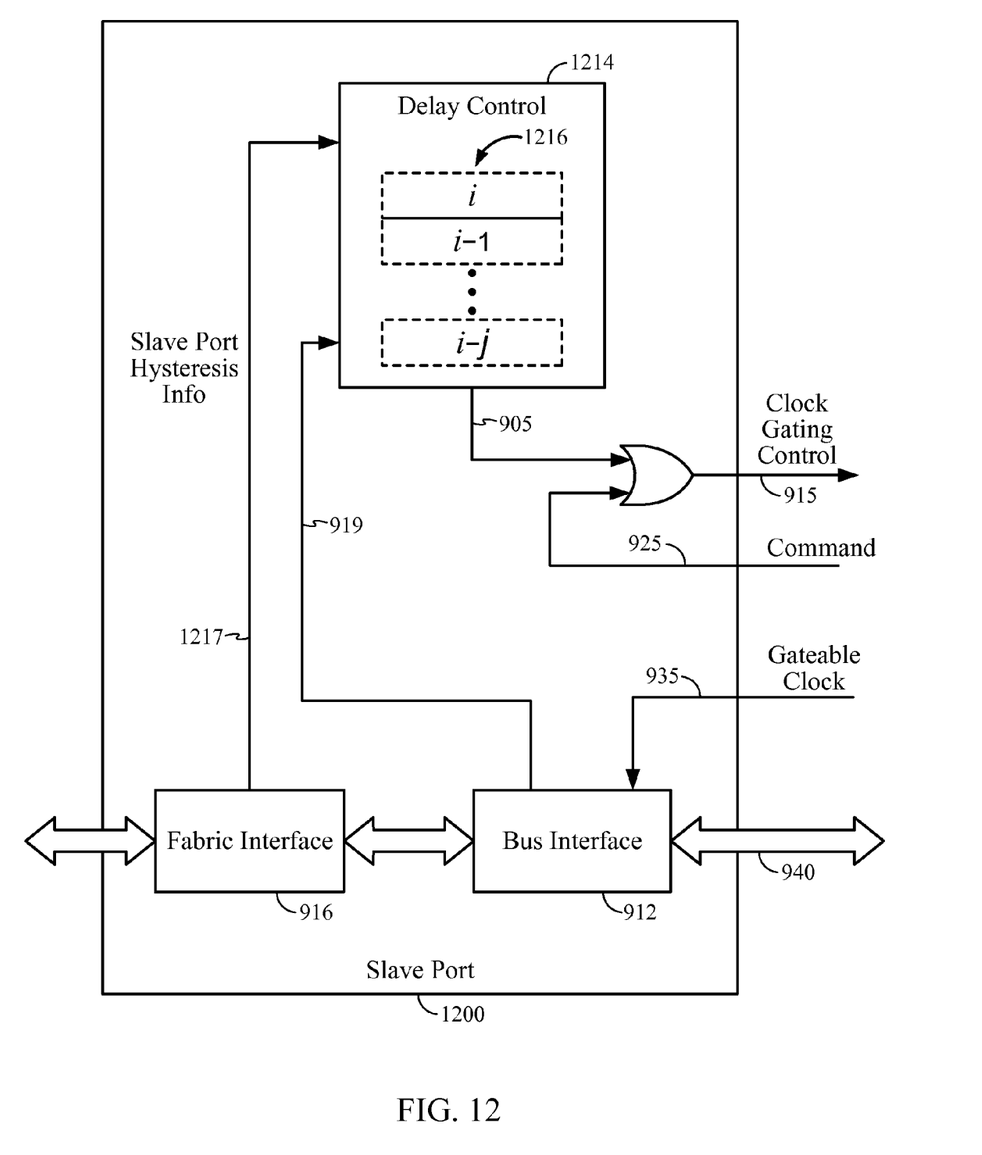
FIG. 12 is a block diagram illustrating clock gating circuitry for a slave port of the data routing fabric circuit of FIG. 4.

FIG. 12 illustrates a slave port 1200 including components as described with reference to FIG. 9 (indicated by like numerals), along with a delay control circuit 1214 configured to receive slave port hysteresis information 1217 that implicitly and/or explicitly indicates clock gating delays to be used by the slave port 1200. For example, the slave port hysteresis information 1217 may comprise information transmitted to the slave port 1200 by one or more master ports in the process of communicating information from the one or more master ports to the same slave via the slave port 1200, such as transfer attributes associated with communications with the one or more master ports and/or explicit hysteresis requests or commands transmitted to the slave port 1200 by the one of more master ports. As illustrated, the delay control circuit 1214 is configured to store slave port hysteresis information 1216 for a most recent ith transaction and for a preceding j transactions conducted via the slave port 1200. For example, the slave port hysteresis information 1216 may be delay values (e.g., numbers of clock periods) that are stored in a first-in-first-out (FIFO) buffer.

The stored slave port hysteresis information 1216 may be associated with a plurality of different master ports that are using the slave port 1200 to communicate with a given slave. These different master ports may communicate divergent slave port hysteresis information to the slave port 1200, e.g., one master port may request or otherwise indicate to the slave port 1200 that a relatively long desired clock gating delay be used, while another port may request or indicate a relatively short desired clock gating delay. The delay control circuit 1214 may collectively process this varied hysteresis information to determine which clock gating delay to apply to the gateable clock signal 935. For example, the delay control circuit 1214 may apply a clock gating delay to the gateable clock signal 935 that corresponds to a greatest one of a plurality of stored clock gating delay values to reduce the likelihood of unnecessary clock gating. It will be appreciated that other selection criteria could be applied and/or that a clock gating delay may be generated based on statistical or other processing of the stored slave port hysteresis information 1216.

While the present invention has been particularly shown and described with reference to exemplary embodiments thereof, it will be understood that various changes in form and details may be made therein without departing from the spirit and scope of the following claims.

The invention claimed is:

1. An apparatus, comprising:
   a communications port configured to communicate, in response to a clock signal, over a bus; and
   a clock signal generation circuit configured to generate the clock signal and to vary, in response to an address of a communications transaction of the communications port, a delay of the clock signal.

2. The apparatus of claim 1, wherein the clock signal generation circuit is further configured to vary, based on an attribute of the communications transaction, the delay of the clock signal.

3. The apparatus of claim 2, wherein the attribute comprises a payload communicated in the communications transaction.

4. The apparatus of claim 2, wherein the clock signal generation circuit is further configured to vary a post-transaction delay by the varying the delay of the clock signal.

5. The apparatus of claim 1, wherein the communications port comprises a plurality of ports of a routing fabric circuit, and the clock signal generation circuit is further configured to independently vary respective delays of clock signals of respective ports in the plurality of ports of the routing fabric circuit.

6. The apparatus of claim 1, wherein the apparatus is an integrated circuit.

7. An apparatus, comprising:
   a routing fabric circuit comprising a plurality of ports configured to communicate, according to associated clock signals, with nodes external to the routing fabric circuit; and
   a control circuit configured to generate the associated clock signals and to vary a delay of a clock signal in the associated clock signals in response to an address of a communications transaction via a port in the plurality of ports.

8. A non-transitory computer-readable media having computer instructions embodied therein executable by a data processing system to produce fabrication instructions configured to fabricate an integrated circuit that includes:
   a communications port configured to communicate, in response to a clock signal, over a bus; and
   a clock signal generation circuit configured to generate the clock signal and to vary, in response to an address of a communications transaction of the communications port, a delay of the clock signal.

9. The apparatus of claim 7, wherein the apparatus is an integrated circuit.

10. The apparatus of claim 7, wherein the control circuit is further configured to:
    store a programmable value representing a respective time delay; and
    delay, based on the programmable value, gating of the clock signal of the port.

11. The apparatus of claim 7, wherein the control circuit is further configured to:
    store a plurality of values representing respective time delays,
    select one of the stored values in the plurality of stored values, and
    delay, based on the selected value, gating of the clock signal of the port.

12. The apparatus of claim 9, wherein the control circuit is further configured to select, based on an attribute of a communications transaction involving the port, the one of the stored values in the plurality of stored values.

13. A non-transitory computer-readable media having computer instructions embodied therein executable by a data processing system to produce fabrication instructions configured to fabricate an integrated circuit that includes:
    a routing fabric circuit comprising a plurality of ports configured to communicate with nodes external to the routing fabric circuit according to associated clock signals; and
    a control circuit configured to generate the associated clock signals and to vary a delay of a clock signal in the associated clock signals in response to an address of a communications transaction on a port in the plurality of ports.

14. An apparatus, comprising:
    a communications port configured to communicate, in response to a clock signal;
    means for generating the clock signal; and
    means for varying, in response to an address of a communications transaction of the communications port, a delay of the clock signal.

15. A method of operating a communications port, the method comprising varying, in response to an address of a communications transaction via the communications port, a delay of a clock signal of the communications port.

16. The method of claim 15, wherein the varying the delay is based on an attribute of the communications transaction.

17. The method of claim 16, wherein the attribute comprises a payload communicated in the communications transaction.

18. The method of claim 15, wherein the varying the delay further comprises varying a post-transaction delay.

19. The method of claim 15, wherein the communications port comprises a plurality of ports of a routing fabric circuit, and the varying the delay further comprises independently varying respective delays of respective clock signals of respective ports in the plurality of ports.

20. A method of operating a routing fabric circuit including a plurality of ports configured to communicate with respective nodes external to the routing fabric circuit, the method comprising:
    storing a plurality of values representing respective time delays;
    conducting a communications transaction via at least one port in the plurality of ports;
    selecting, based on an address of the communications transaction, one of the plurality of stored values; and delaying, based on the selected stored value, gating of a respective clock signal of the at least one port in the plurality of ports.

21. The method of claim 20, wherein the storing the plurality of values further comprises storing a programmed value.

22. An apparatus, comprising:
a routing fabric circuit including a plurality of ports configured to communicate with respective nodes external to the routing fabric circuit;
means for storing a plurality of values representing respective time delays;
means for conducting a communications transaction via at least one port in the plurality of ports;
means for selecting, based on an address of the communications transaction, one of the plurality of stored values; and
means for delaying, based on the selected stored value, gating of a respective clock signal of at least one port in the plurality of ports.

* * * * *